United States Patent [19]

Coates et al.

[11] 3,978,102
[45] Aug. 31, 1976

[54] NOVEL DIORGANOTIN MALEATE HALF ESTERS AND PROCESS FOR PREPARING SAME

[75] Inventors: Harold Coates, Wombourne; John Desmond Collins, Albrighton; Iftikhar Hussain Siddiqui, Birmingham, all of England

[73] Assignee: Albright & Wilson Limited, Midlands, England

[22] Filed: Jan. 13, 1975

[21] Appl. No.: 540,428

[30] Foreign Application Priority Data
May 10, 1972 United Kingdom ............... 21828/72

Related U.S. Application Data

[63] Continuation-in-part of Ser. No. 359,177, May 10, 1973, abandoned, Ser. No. 490,241, July 22, 1974, Pat. No. 3,933,743 is a divisional of said Ser. No. 359,177.

[52] U.S. Cl. ............... 260/429.7; 260/45.75 J; 260/45.75 S
[51] Int. Cl.² ............... C07F 7/22
[58] Field of Search ............... 260/429.7, 45.75 J

[56] References Cited
UNITED STATES PATENTS

| | | | |
|---|---|---|---|
| 3,078,290 | 2/1963 | Hechenbleikner et al. | 260/429.7 |
| 3,126,400 | 3/1964 | Cramer et al. | 260/429.7 |
| 3,413,264 | 11/1968 | Hechenbleikner et al. | 260/429.7 X |
| 3,562,305 | 2/1971 | Hoch | 260/429.7 |
| 3,565,931 | 2/1971 | Brecker | 260/429.7 |
| 3,642,846 | 2/1972 | Hoch | 260/429.7 |
| 3,833,631 | 9/1974 | Berczi et al. | 260/429.7 X |

*Primary Examiner*—Helen M. S. Sneed

[57] ABSTRACT

Organotin compounds with low tin content suitable as stabilizers for halogen containing resins e.g. polyvinyl chloride are of formula

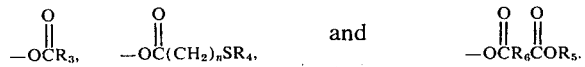

where $R_1$ and $R_2$ are $C_{1-20}$ alkyl, cycloalkyl or phenyl groups, $Q_1$ represents a radical selected from the group consisting of

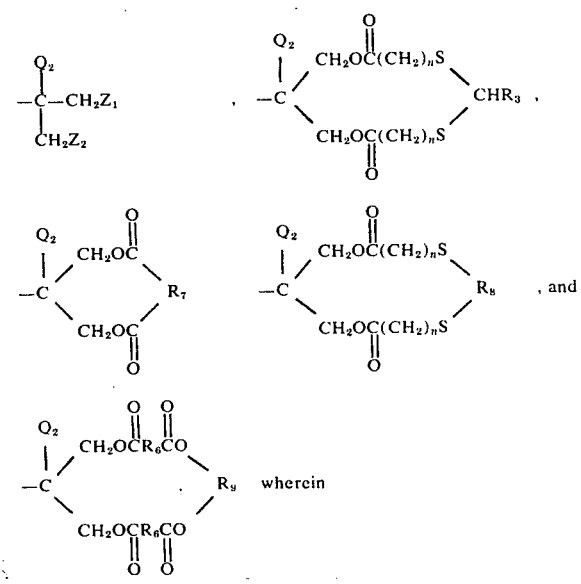

$Q_2$ is a hydrogen atom, an alkyl group containing between 1 and 6 carbon atoms or the group $-CH_2Z_3$.

$Z_1$, $Z_2$, and $Z_3$ are individually selected from the group of groups consisting of $$-OCR_3, \quad -OC(CH_2)_nSR_4, \quad \text{and} \quad -OCR_6COR_5.$$

$R_3$ is an alkyl group containing between 1 and 20 carbon atoms, a substituted or unsubstituted phenyl group or a substituted or unsubstituted alkylphenyl group.

$R_4$ is an alkyl grup containing between 1 and 20 carbon atoms, a substituted phenylakly or unsubstituted phenylalkyl group wherein the alkyl portion of the radical contains between 1 and 6 carbon atoms.

$R_5$ is an alkyl group containing between 1 and 20 carbon atoms, a substituted phenyl, unsubstituted phenyl, substituted alkylphenyl or unsubstituted alkylphenyl group.

$R_6$ represents a single bond, an alkylene group containing between 1 and 20 carbon atoms, an alkenylene group containing between 2 and 20 carbon atoms, a substituted phenylene or an unsubstituted phenylene group.

$R_7$ represents a single bond, an alkylene group containing between 1 and 20 carbon atoms, an alkenylene group containing between 2 and 20 carbon atoms, a substituted phenylene group or an unsubstituted phenylene group.

$R_8$ represents an alkylene group containing between 1 and 20 carbon atoms, said alkylene group being either unsubstituted or containing at least one phenyl group as a substituent, an alkenylene group containing between 2 and 20 carbon atoms or a cycloalkylene group containing between 5 and 6 carbon atoms.

$R_9$ represents an alkylene group containing between 1 and 20 carbon atoms.

$n$ is an integer between 1 and 6 inclusive.

$Y$ is of the formula

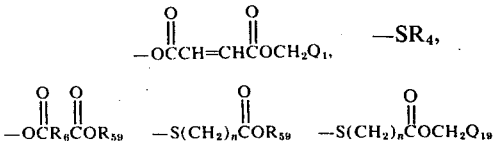

or Y and the aforementioned group

[54]

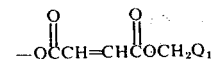

together constitute a divalent group radical of the formula

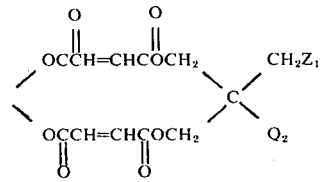

wherein both free valences of said divalent group are bonded to the same tin atom.

17 Claims, No Drawings

NOVEL DIORGANOTIN MALEATE HALF ESTERS AND PROCESS FOR PREPARING SAME

This application is a continuation-in-part of application Ser. No. 359,177, filed on May 10, 1973, and now abandoned.

A divisional application of said Ser. No. 359,177 was filed. The divisional application, Ser. No. 490,241 filed on July 22, 1974, issued as U.S. Pat. No. 3,933,743 on Jan. 20, 1976 with claims directed to a stabilized polymer composition.

The present invention relates to organotin compounds, processes for preparing them, and to their use as stabilizers for polymeric materials, in particular halogenated resins such as polymers and copolymers of vinyl and vinylidene chloride.

The use of organotin compounds including derivatives of half esters of organotin maleates as stabilizers for halogenated resins has for many years been recognized as being highly effective. However, the compounds employed have normally been those having a comparatively high tin content and so, in view of the high cost of tin, are expensive relative to other available stabilizers. Thus, despite their high efficiency these compounds are still not so widely used as other less effective materials.

The compounds of the present invention are new derivatives of organotin half ester maleates which have a lower tin content than most conventional organotin compounds and so are potentially cheaper. The stabilizing ability of some of them may match that of some of the conventional materials on an equal tin basis and so may be able to achieve the same degree of stabilization for lower cost.

Accordingly, the present invention provides an organotin compound of the formula

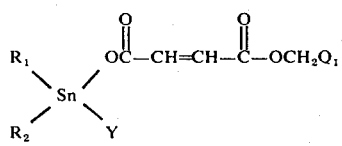

wherein each of $R_1$ and $R_2$, which are the same or different, is an alkyl group containing 1 to 20 carbon atoms, a cycloalkyl or a phenyl group.

$Q_1$ represents a group selected from the group consisting of

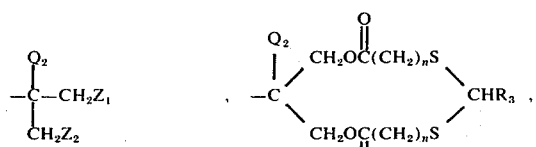

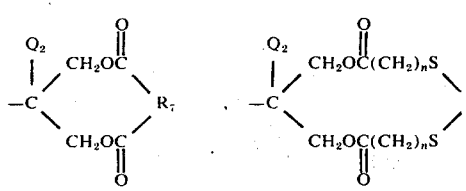

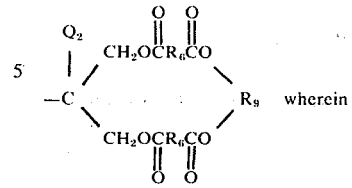

$Q_2$ is a hydrogen atom, an alkyl group containing between 1 and 6 carbon atoms or the group $-CH_2Z_3$.

$Z_1$, $Z_2$, and $Z_3$ are individually selected from the group of groups consisting of

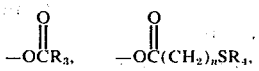

and

$R_3$ is an alkyl group containing between 1 and 20 carbon atoms, a substituted or unsubstituted phenyl group or a substituted or unsubstituted alkylphenyl group.

$R_4$ is an alkyl group containing between 1 and 20 carbon atoms, a substituted phenylalkyl or unsubstituted phenylalkyl radical wherein the alkyl portion of the group contains between 1 and 6 carbon atoms.

$R_5$ is an alkyl group containing between 1 and 20 carbon atoms, a substituted phenyl, unsubstituted phenyl, substituted alkylphenyl or unsubstituted alkylphenyl group.

$R_6$ represents a single bond, an alkylene group containing between 1 and 20 carbon atoms, an alkylene group containing between 2 and 20 carbon atoms, a substituted phenylene or an unsubstituted phenylene group.

$R_7$ represents a single bond, an alkylene group containing between 1 and 20 carbon atoms, an alkylene group containing between 2 and 20 carbon atoms, a substituted phenylene group or an unsubstituted phenylene group.

$R_8$ represents an alkylene group containing between 1 and 20 carbon atoms, said alkylene group being either unsubstituted or containing at least one phenyl group as a substituent, an alkylene group containing between 2 and 20 carbon atoms or a cycloalkylene group containing between 5 and 6 carbon atoms.

$R_9$ represents an alkylene group containing between 1 and 20 carbon atoms.

$n$ is an integer between 1 and 6 inclusive.

Y is of the formula $$-\overset{O}{\overset{\|}{O}C}CH=CH\overset{O}{\overset{\|}{C}}OCH_2Q_1,$$

$-SR_4$,

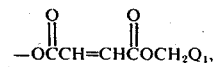

or Y and the aforementioned group

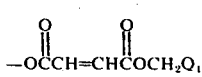

together constitute a divalent group of the formula

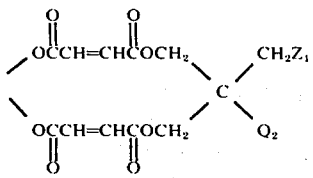

wherein both free valences of said divalent group are bonded to the same tin atom.

Preferably $Q_1$ is of the formula

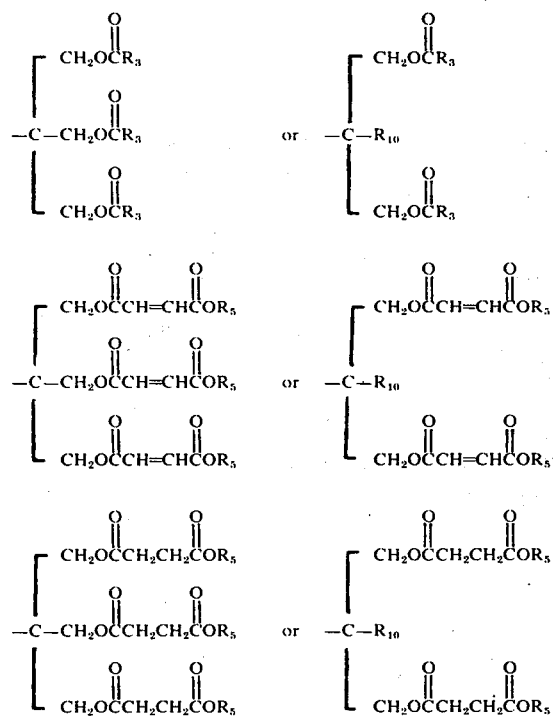

In the foregoing formulae, $R_{10}$ represents a hydrogen atom or an alkyl group containing between 1 and 6 carbon atoms.

Examples of particular groups of compounds falling within the scope of the invention which we have found to be useful include:

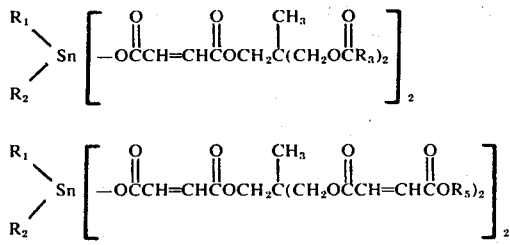

In preferred compounds of the invention, $R_1$ and $R_2$ are n-butyl or n-octyl radicals, $R_3$ is an alkyl radical of 8–20 carbon atoms, especially an n-undecyl radical, or o-hydroxyphenyl radical, $R_4$ and $R_5$ are alkyl radicals of 8–20 carbon atoms, especially iso-octyl radicals, $R_6$ is a vinyl or ethylene radical, $R_7$ is hydrogen or a methyl radical and n is 2.

The present invention also provides a process for preparing an organotin compound containing a

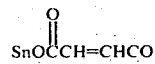

radical, which comprises in step (a) reacting an alcoholic component which is at least one of pentaerythritol and a triol of formula $(HOCH_2)_3CR_{10}$, maleic acid (or a derivative thereof, preferably maleic anhydride) and one or more blocking agents, which are (i) of formula $R_3COOH$, a mixture of compounds of formula $R_6(COOH)_2$ and $R_5OH$ or the resultant ester of formula $HOOCR_6COOR_5$, of formula $HOOC(CH_2)_nSR_4$ or $[HOOC(CH_2)_nS]_2CHR_3$, of the reaction product of $HOOC(CH_2)_nSH$ and $HalR_4$, $Hal_2CHR_3$ (Hal is a halogen) or $R_3CHO$ when the number of moles of OH group in the alcoholic component is greater than the number of moles of maleic acid (or derivative thereof), or (ii) compounds of formula $R_5OH$ when the number of moles of alcoholic component is less than the number of moles maleic acid (or derivative thereof), the alcoholic component, blocking agent, and maleic acid (or derivative thereof) being reacted in any order, to produce an intermediate containing 1 or 2 maleic acid residues, i.e.

per mole, and in step (b) reacting the intermediate formed in step (a) with a diorganotin compound of formula $R_1R_2SnO$ or $R_1R_2SnHal_2$.

In step (b) of the process, each mole of the organotin compound can optionally be reacted with one mole of the intermediate from step (a) in the presence of a total of one mole of at least one compound of formula $HSR_4$, $HOOCR_6COOR_5$ or $HS(CH_2)_nCOOR_5$. In preferred processes, the alcoholic component is reacted with a molar excess of maleic anhydride, and the reaction product produced is reacted with a blocking agent of formula $R_5OH$, or the alcoholic component is reacted with a compound of formula $HOOCR_6COOR_5$ to form a reaction product containing 1 mole of $HOCH_2$- group per mole of compound, and the reaction product is reacted with maleic anhydride.

Alternatively the alcoholic component can be reacted with a difunctional blocking agent of the formula

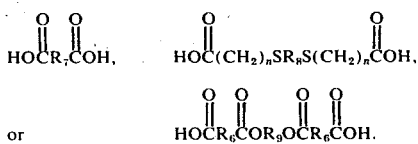

The foregoing formulae represent a dicarboxylic acid, the reaction product of two moles of a mercaptoacid with one mole of an organic dihalide $R_8Hal_2$, and the reaction product of two moles of a dicarboxylic acid of the formula

with one mole of a diol $HOR_9OH$, respectively.

If any of the groups $R_3$, $R_4$, $R_5$, $R_6$, $R_7$, $R_8$, or $R_9$ contain inert substituents on a phenyl, an alkylphenyl, or a phenylalkyl group, the substituent is introduced by selecting the proper acid, halide, phenol, or diacid, as required, for example, a chlorinated benzoic acid, a nitrated chlorobenzene, or nitrated phenol. One mole of the difunctional blocking agent would be employed for every two moles of hydroxyl groups to be blocked.

Compounds wherein $Q_1$ represents the radical

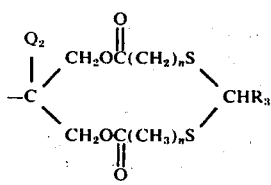

are prepared by reacting equimolar amounts of the alcohol component,

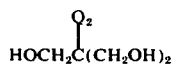

and the reaction product of an aldehyde,

or a dihalide $R_3CHHal_2$, with a mercaptoacid of the formula

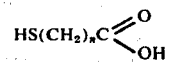

The reaction product can be formed in situ by adding stoichiometric amounts of the alcohol component, aldehyde or dihalide, and the mercaptoacid to the reaction mixture.

Diorganotin compounds of the formula

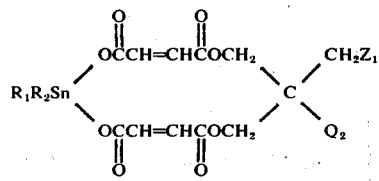

can be prepared by first reacting each mole of the alcohol component $Q_2(CH_2OH)_3$ with n-2 moles of the desired blocking reagents, as defined hereinbefore, $n$ being equal to the number of hydroxyl radicals present on the alcohol component, and 2 moles of maleic acid or a suitable derivative thereof, such as maleic anhydride. The resultant product, a mixed ester, is then reacted with a diorganotin oxide or a diorganotin dihalide.

Among the compounds which are particularly useful are those derived from pentaerythritol. These can be obtained by the reaction of a diorganotin oxide with a reaction product derived from pentaerythritol, maleic anhydride and a blocking agent as defined hereinbefore. The blocking agent is preferably a fatty acid. As previously disclosed, dicarboxylic acids can also be employed as blocking agents. Such acids include succinic and maleic acids. If these acids are employed, the free carboxyl group can either be esterified by a fatty alcohol or reacted with a second hydroxyl group on the pentaerythritol molecule.

It is also possible to employ 1,1,1-trimethylol ethane or a higher homologue thereof instead of pentaerythritol; in this case there are only three reactive hydroxyl groups and thus a lower proportion of maleic anhydride will normally be employed.

Normally, whatever the actual reactants employed, it will be desirable to have an acidic catalyst present such as p-toluene sulphonic acid, hydrochloric acid, or a metal chloride suitable as a Friedel Craft catalyst, such as zinc chloride. Often the reaction will be carried out in the presence of a solvent such as an aromatic hydrocarbon, e.g. a toluene, petrol, xylene, hexane or cyclohexane.

Compounds according to the invention find use as stabilizers for halogen-containing resins.

Accordingly, from a further aspect of the present invention provides a composition which comprises a halogen-containing resin (as hereinafter defined) and as a stabilizer therefor an organotin compound of the formula

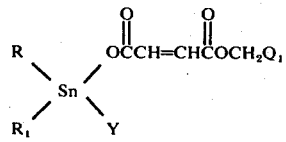

wherein R, $R_1$, n, $Q_1$, and Y are as hereinbefore defined or one prepared by the process of the invention.

In the present specification, a halogen containing resin is defined as a polymer or copolymer or vinyl chloride or vinylidene chloride, a chlorinated vinyl chloride polymer or chlorinated polyethylene.

The organotin compounds will be present in compositions according to the invention in amount so as to produce the desired stabilizing effect; often this will be 0.01–10%, preferably 0.2–5% especially 2 to 3% by weight based on the total amount of polymeric resin present.

It has also been found that by mixing 1 to 50% by weight (based on the weight of organotin compound of the invention) of a monoalkyltin compound such as monobutyltin tris (iso-octyl thioglycollate) with the organotin compound, the stabilizing efficiency of the compound increases. Preferably 5 – 25% based on total amount of organotin compound is used. Other additives which also improve the initial clarity of polymer during thermal tests with organotin compounds are:-
 a. Butyl epoxy stearate (B.E.S)
 b. Mono-octyltin tri (iso-octyl thioglycollate)
 c. Dibutyltin sulphide and oxide
 d. Dibutyltin cyclic mercapto acetate and/or Dibutyltin cyclic β mercapto propionate. And/or Dioctyltin cyclic mercapto acetate and/or Dioctyltin cyclic β mercapto.

Optionally, but advantageously, compositions according to the invention also contained hindered phenols, that is those having at least one alkyl substituent in a position ortho to the hydroxyl group as auxiliary stabilizers. Such phenols which are of use in compositions of the present invention include butylated hydroxylaisole, 2,6-di-tert.-butylphenol, methylen bis-(2,4-di-tert.-butylphenol), methylen bis-(2,6-di-tert.-butylphenol), methylene bis-(2,6-di-tert.-butyl-3-methylphenol), 4,4'-butylidene bis-(6-tert.-butyl-3-methylphenol), methylene bis-(4-ethyl-6-tert.-butylphenol), methylene bis(4-metyl-2,6-di-tert.-butylphenol). Particularly preferred, however, is 2,6-di-tert.-butyl-4-methyl-phenol. Such phenols may be present in an amount of up to 3%, preferably from 0.01 to 0.05% by weight of the resin and will normally be present at about 4-10% by weight, preferably 5-8%, based on the total amount of organotin compounds used.

Esters of phosphorous and thiophosphorous acid may be employed in compositions according to the invention. Such compounds include halo-phosphites such as tris chloropropyl phosphite and polymeric phosphites such as those obtained from hydrogenated 4,4'-isopropylidene diphenol. preferred phosphite and thiophosphites, however, are monomers having no substitutents in the organo-group and having no more than one sulphur atom. These include triaryl phosphites and trialkyl phosphites. Such compounds include, for example, triphenyl phosphite, trixylylphosphite, tri-(nonyl phenyl) phosphite and trioctyl phosphite. Diesters of phosphorous acid such as di-isopropyl phosphite, dibutyl phosphite and diphenyl phosphite are also of use. Particularly preferred, however, are the mixed alkyl aryl phosphites such as octyl diphenyl phosphite, isodecyl diphenyl phosphite and di-isodecyl phenyl phosphite. This particularly pronounced effect may also be obtained by employing a mixture of a triaryl phosphite and an alcohol in conjunction with the organotin compound. A particularly suitable mixture is that of triphenyl phosphite and isodecanol.

The stabilizer composition is also useful if it is employed in a polymer composition containing an epoxy compound, as may be desired for example in cases where a delay of initial colour change is desired. Epoxy compounds which may be employed in such compositions include butyl epoxy stearate, esters of epoxidised oleic acid and compounds of the formula

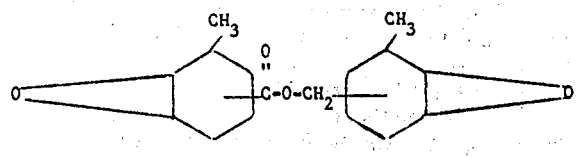

Organotin formulations as described above, optionally including a hindered phenol, an alkylaryl phosphite or an epoxide, will often be used as the only stabilizer in a polymeric vinyl chloride or vinylidene chloride composition. However, if desired conventional thermal stabilizers may also be included. These may include, for example, metal soap stabilizers, such as cadmium, barium or zinc salts of fatty acids, or lead salts such as lead carbonate or stearate or dibasic lead phosphate or phthalate, or tribasic lead sulphate or conventional organotin stabilizers such as dibutyltin dilaurate or dibutyltin maleate or sulphur-containing compounds such as dibutyltin bisthioglycollates.

In the practice of the invention the stabilizer formulation may be mixed with the copolymer resin in the conventional manner, for example by milling with the resin on heated rols at 100°–160°C, e.g. about 150°C, although higher temperatures may be used when convenient, or by being mixed with particles of the polymer and then melting and extruding the mixture or by adding the stabilizer to a liquid resin.

Resins which may be used in compositions according to the invention normally contain at least 40% by weight of chlorine. Usually it will be a polymer or copolymer of vinyl chloride or vinylidene chloride but post-halogenated polyvinyl chloride or post halogenated polyolefines, such as polyethylene, may be employed if desired. Suitable monomers, which may form such copolymers with vinyl chloride and vinylidene chloride, include for example acrylonitrile, vinyl acetate, methyl methacrylate, diesters of fumaric acid and maleic acid, ethylene, propylene and lauryl vinyl ether and these co-monomers may be present in an amount of up to 25% of the total weight of monomers copolymerised.

The organotin stabilizer formulation may be employed in either plasticised resin compositions, for example those plasticised with carboxylic ester plasticisers, e.g. di-2-ethylhexyl phthalate, dibutyl sebacate, and di-iso-octyl phthalate or with phosphate esters such as tri (alkyl phenyl) phosphates may be employed in rigid compositions. Such rigid compositions contain little or no plasticiser although for some applications up to about 10% by weight of plasticiser may be present. This is in contrast with plasticised compositions where the amount of plasticiser present is normally greater than 50% by weight of the polymeric material and is often greater tha 100% on that basis.

In addition to the stabilizers, the compositions of the invention may also contain conventional additives, e.g. pigments, fillers, dyes and ultraviolet absorbing agents.

The process of the invention will be illustrated by the following examples:

EXAMPLE 1

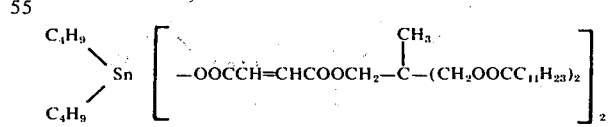

1,1,1 - Trimethylolethane (11.8g, ca 0.1M) and Lauric acid (40g, 0.2M) were refluxed in toluene (200ml) in presence of p-toluene sulphonic acid (ca 0.5g) till the calculated amount of water had collected to give product H, i.e.

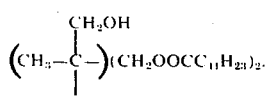

Maleic anhydride (9.8g, 0.1M) was added into the solution (containing product H) and the mixture further refluxed for two hours to give product J i.e.

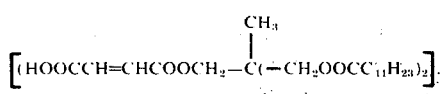

Dibutyltin oxide (12.5 g., 0.05M) was also added into the above solution containing product J and the desired product was obtained.

| Analysis | Calculated | Found |
|---|---|---|
| | Sn = 8.5% | Sn = 8.15% |
| | C = 63.6% | C = 64.87% |
| | H = 9.4% | H = 10.0% |

Its structure was also confirmed by I.R. analysis

EXAMPLE 2

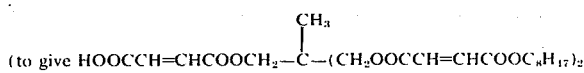

It was prepared by the same method as in Example 1 using the following quantities:-

| Step 1 | (a) | 1,1,1 - Trimethylolethane | 12g(0.1M) |
|---|---|---|---|
| | (b) | Lauric acid | 40g(0.2M) |
| Step 2 | (c) | Maleic anhydride | 9.8g(0.1M) |
| Step 3 | (d) | Dioctyltin oxide | 18g(0.05M) |
| Analysis | | Calculated | Found |
| | | C = 65.3% | C = 65.94% |
| | | H = 9.8% | H = 10.4% |
| | | Sn = 7.8% | Sn = 7.45% |

Its structure was also confirmed by I.R.

EXAMPLE 3

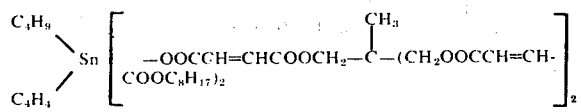

1,1,1 - Trimethylolethane (12g, 0.1M) and Maleic anhydride (28.4g, 0.3M) were heated in toluene under reflux for 2 hours [(to give $CH_3-C-(CH_2OOCCH=CHCOOH)_3$]. Iso-octyl alcohol (26g,0.2M) was also added into the solution, and the mixture further refluxed till the calculated amount of water had collected in Dean & Stark apparatus (to give $HOOCCH=CHCOOCH_2-\underset{\underset{}{|}}{\overset{CH_3}{C}}-(CH_2OOCCH=CHCOOC_8H_{17})_2$ After cooling the solution at room temperature dibutyltin oxide (12.5g,0.05M) was added into it and the mixture refluxed till the completion of reaction as in Exp. 1. The product is a light yellow liquid.

| Analysis | Calculated | Found |
|---|---|---|
| | Sn = 7.9% | Sn = 9.2% |
| | C = 58.9% | C = 58.3% |
| | H = 7.7% | H = 7.8% |

Its structure was also confirmed by I.R. analysis.

EXAMPLE 4

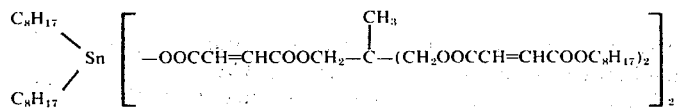

It was prepared by the same method and using the same quantities as in Experiment 3 (except using dioctyltin oxide (0.05M) instead of dibutyltin oxide)

EXAMPLE 5

The stabilizers of the present invention can be used with halogen containing vinyl and vinylidene resins in which the halogen is attached directly to the carbon atoms of the polymer chain. Preferably, the resin in vinyl halide resin, especially a vinyl chloride, resin.

The product of Example 1 of the present invention was tested for initial colour development against know stabilisers on an equal tin basis.

This example illustrates the stabilising effect of the compounds of the present invention in comparison with known stabilisers (ie Mellite 26 & Mellite 29) containing equal amount of tin in a rigid P.V.C. composition.

A series of rigid (non-plasticized) formulations was prepared having the following composition.
 a. Corvic D55/09 .... 100 parts
 b. Laurex CS Marked T if added the amount present in parts per 100 parts of polymer are indicated inside the brackets. In many instances of the present invention Laurex CS has not been added to the polymer because many of the compounds tested are themselves acting as a lubricant during milling at about 155°C,
 c. The example in Table 1 has been tested in comparison with Mellite 29 and Mellite 26 containing equal amount of tin in definite amount of Corvic D55/09 (usually 300 gms.)

| Additive ( ) is wt. % | Parts of Compound | | Gardner scale colour after heating at 190°C for given time in minutes | | | |
|---|---|---|---|---|---|---|
| | | | 0 | 5 | 10 | 15 |
| (a) Example 1 | (a) | 2 parts | 0 | 2–3 | 5 | >9 |
| (b) M29 + T(0.5) | (b) | Tin.Equiv. to (a) | 0 | 2–3 | 4 | 6–7 |
| (c) M26 + T (0.5) | (c) | Tin Equiv to (a) | 0 | 2 | 3–4 | 6–7 |

What is claimed is:
1. An organotin compound of the formula

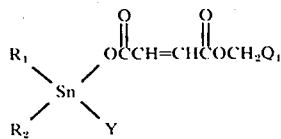

wherein $R_1$ and $R_2$ are individually selected from the group consisting of alkyl groups containing between 1 and 20 carbon atoms, cycloalkyl and phenyl groups, $Q_1$ represents a group of the formula

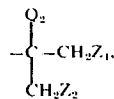

wherein $Q_2$ is a hydrogen atom, an alkyl group containing between 1 and 6 carbon atoms or $-CH_2Z_3$,
$Z_1$, $Z_2$, and $Z_3$ are individually selected from the group consisting of

$R_3$ is an alkyl group containing between 1 and 20 carbon atoms, a phenyl or alkylphenyl group,
$R_4$ is an alkyl group containing between 1 and 20 carbon atoms, a phenyl or alkylphenyl group,
$R_5$ represents a single bond, an alkylene group containing between 1 and 20 carbon atoms, an alkenylene group containing between 2 and 20 carbon atoms or a phenylene group, and
Y is of the formula

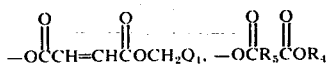

or Y and the aforementioned

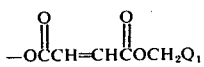

together constitute a divalent group of the formula

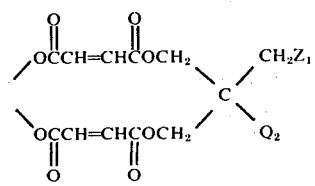

wherein both free valences of said divalent group are bonded to the same tin atom.

2. A compound according to claim 1 wherein $Q_1$ is of formula

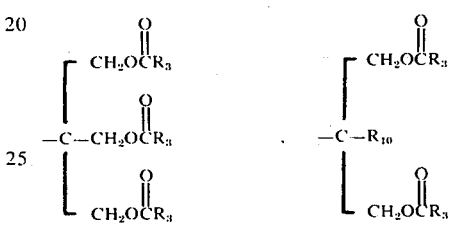

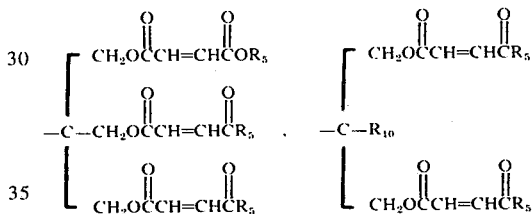

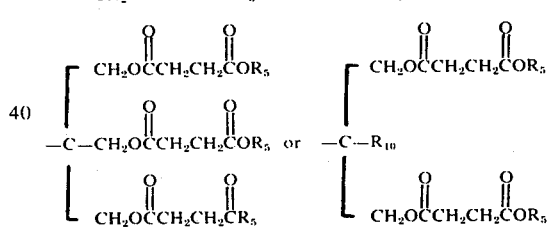

wherein $R_{10}$ is hydrogen or an alkyl group of 1 to 6 carbon atoms.

3. A compound according to claim 1 wherein $R_5$ is a vinyl or ethylene radical.

4. A compound according to claim 1 wherein Y is of formula

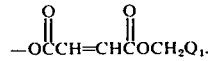

5. A compound according to claim 4 which is of formula

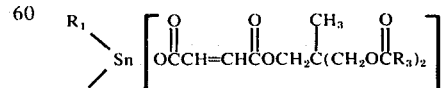

or

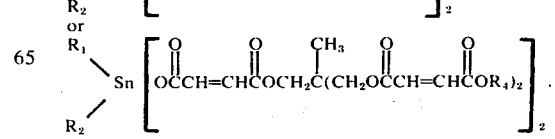

6. A compound according to claim 5 wherein each of $R_3$ and $R_4$, which are the same or different, is an alkyl group of 8–20 carbon atoms.

7. A compound according to claim 1 wherein $R_1$ and $R_2$ are n-butyl or n-octyl, $R_3$ is alkyl containing 8–20 carbon atoms $R_4$ is alkyl containing 8–20 carbon atoms and $R_5$ is vinyl or ethylene.

8. A compound according to claim 7 which is of the formula

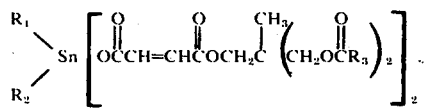

9. A compound according to claim 8 of the formula

10. A compound according to claim 8 of the formula

11. A compound according to claim 7 of the formula

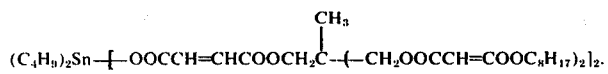

12. A compound according to claim 7 of the formula

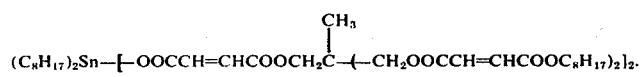

13. A method for preparing an organotin derivative of maleic acid, the method comprising the following steps:
1. preparing an intermediate by reacting together
   a. pentaerythritol or a triol of the formula $(HOCH_2)_3CR_{10}$
   b. maleic acid or maleic anhydride, wherein the number of moles of hydroxyl groups in said pentaerythritol or triol exceeds the number of moles of maleic acid or maleic anhydride, and
   c. at least one blocking agent selected from the group consisting of
      1. compounds of the formula $R_3COOH$, $HOOCR_6COOR_5$, $HOOCR_7COOH$, $HOOCR_6COOH$ or $(HOOCR_6COO)_2R_9$, or
      2. mixtures containing compounds of the formula $R_6(COOH)_2$ and $R_5OH$, and the compounds a), b) and the blocking agent being reacted at the boiling point and to yield an intermediate containing one or two

radicals per molecule,
2. reacting together said intermediate with a diorganotin oxide of the formula $R_1R_2SnO$ or a diorganotin dihalide of the formula $R_1R_2SnHal_2$ at the boiling point of the resultant mixture, wherein each of $R_1$ and $R_2$, which are the same or different, is an alkyl radical containing from 1 to 20 carbon atoms, a cycloalkyl radical or a phenyl radical, $R_3$ and $R_5$ are individually selected from the group consisting of alkyl groups containing between 1 and 20 carbon atoms, phenyl and alkylphenyl groups, $R_6$ and $R_7$ are individually selected from the group consisting of single bonds, alkylene groups containing between 1 and 20 carbon atoms, alkenylene groups containing between 2 and 20 carbon atoms and phenylene groups, $R_9'$ represents an alkylene group containing between 1 and 20 carbon atoms, and $R_{10}$ is a hydrogen atom or an alkyl group containing between 1 and 6 carbon atoms.

14. A process according to claim 13 wherein the organotin compound is reacted with the intermediate from Step 1) in the presencce of at least one compound of the formula $HOOCR_6COOR_5$.

15. A process according to claim 13 wherein the alcoholic component is reacted with a compound of formula $HOOCR_6COOR_5$ to form a reaction product containing 1 $HOCH_2$ group per mole, and the reaction product is reacted with maleic anhydride.

16. A method for preparing an organotin derivative of maleic acid, the method comprising the following steps:
1. preparing an intermediate by reacting together
   a. pentaerythritol or a triol of the formula $(HOCH_2)_3CR_{10}$
   b. maleic acid or maleic anhydride, wherein the number of moles of hydroxyl radicals in said pentaerythritol or triol is less than the number of moles of maleic acid or maleic anhydride, and
   c. at least one blocking agent of the formula $R_5OH$, the compounds a), b) and the blocking agent being reacted at the boiling point of the resulant mixture to yield an intermediate containing one or two

radicals per molecule, and
2. reacting together said intermediate with a diorganotin oxide of the formula $R_1R_2SnHal_2$ at the boiling point of the resultant mixture, wherein each of $R_1$ and $R_2$, which are the same or different, is an alkyl radical containing from 1 to 20 carbon atoms, a cycloalkyl radical or a phenyl radical, $R_5$ is alkyl containing between 1 and 20 carbon atoms, phenyl or alkylphenyl and $R_{10}$ is a hydrogen atom or alkyl containing between 1 and 6 carbon atoms.

17. A process according to claim 16 wherein the organotin compound is reacted with the intermediate from Step 1) in the presence of at least one compound of the formula $HOOCR_6COOR_5$ wherein $R_6$ represents a single bond, alkylene containing between 1 and 20 carbon atoms, alkenylene containing between 2 and 20 carbon atoms or phenylene.

* * * * *

UNITED STATES PATENT OFFICE
CERTIFICATE OF CORRECTION

Patent No. 3,978,102　　　　　　　Dated August 31, 1976

Inventor(s) HAROLD COATES et al

It is certified that error appears in the above-identified patent and that said Letters Patent are hereby corrected as shown below:

The following three formulas which appear in the right-hand column of the ABSTRACT, about one-third up from the bottom, should correctly read

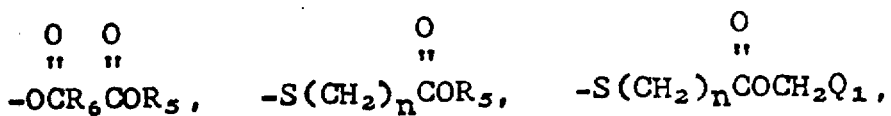

Column 2, in each of lines 38, 43 and 50 replace "alkaline" with --alkenylene--.

UNITED STATES PATENT OFFICE
CERTIFICATE OF CORRECTION

Patent No. 3,978,102                    Dated August 31, 1976

Inventor(s) HAROLD COATES et al

It is certified that error appears in the above-identified patent and that said Letters Patent are hereby corrected as shown below:

Column 5, line 61, replace "$Q_2(CH_2OH)_3$" with --$Q_2C(CH_2OH)_3$--.

Column 13, line 25, in the formula of claim 9, replace the formula with the following:

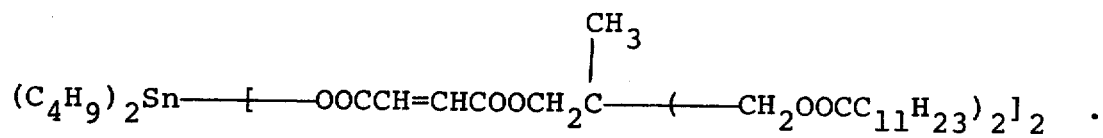

Signed and Sealed this

Twenty-third Day of May 1978

[SEAL]

Attest:

RUTH C. MASON
Attesting Officer

LUTRELLE F. PARKER
Acting Commissioner of Patents and Trademarks